United States Patent [19]

Yamaguchi et al.

[11] Patent Number: 4,949,287
[45] Date of Patent: Aug. 14, 1990

[54] DOCUMENT PROCESSING SYSTEM

[75] Inventors: Koji Yamaguchi; Mika Fukui, both of Yokohama; Isamu Iwai, Kawasaki, all of Japan

[73] Assignee: Kabushiki Kaisha Toshiba, Kawasaki, Japan

[21] Appl. No.: 367,436

[22] Filed: Jun. 16, 1989

[30] Foreign Application Priority Data

Jun. 16, 1988 [JP] Japan ................................ 63-149170

[51] Int. Cl.$^5$ ............................................ G06F 15/00
[52] U.S. Cl. .................................... 364/523; 364/518; 400/61
[58] Field of Search ................................ 364/518–523, 364/225.6 MS, 239.3 MS, 939.2 MS; 400/61, 62, 67; 346/154

[56] References Cited

U.S. PATENT DOCUMENTS

4,710,886  12/1987  Heath .................................. 364/523
4,737,822   4/1988  Ogasawara et al. ................ 364/523

*Primary Examiner*—Authur G. Evans
*Attorney, Agent, or Firm*—Oblon, Spivak, McClelland, Maier & Neustadt

[57] ABSTRACT

A document processing system for laying out text data and image data referred to in the text data, thereby forming a document data. The system comprises a format-data storage section, a reference-data storage section, and a layout section. The format-data storage section stores format data including region-attribute data specifying an image-layout inhibited region in which to lay out no image data. The reference-data storage section stores reference data representing the relationship between the image data and an image-referring part of the text data in which the image data is referred to. The layout section lays out the text data in accordance with the region-attribute data and the reference data, and lays out the image data outside the image-layout inhibited region specified by the region-attribute data, in accordance with the reference data, thereby to form document data.

27 Claims, 13 Drawing Sheets

| CATEGORY | ITEM |
|---|---|
| IMAGE CLASSIFICATION WORDS | TABLE<br>FIGURE<br>FIG.<br>⋮ |
| ALPHANUMERIC EXPRESSIONS | 1, 2, 3, ----<br>①, ②, ③, ----<br>I, II, III, ----<br>A, B, C, ---- |
| ADDITIONAL WORDS | NO.<br>#<br>⋮ |

| | UPPER PART | LOWER PART |
|---|---|---|
| TEXT FRAME 1 | IMPOSSIBLE | POSSIBLE |
| TEXT FRAME 2 | IMPOSSIBLE | POSSIBLE |

FIG. 6A

| | UPPER PART | LOWER PART |
|---|---|---|
| TEXT FRAME 1 | IMPOSSIBLE | IMPOSSIBLE |
| TEXT FRAME 2 | POSSIBLE | POSSIBLE |

FIG. 6B

| | UPPER PART | LOWER PART |
|---|---|---|
| LEFT-HALF OF PAGE FRAME | IMPOSSIBLE | POSSIBLE |
| RIGHT-HALF OF PAGE FRAME | IMPOSSIBLE | POSSIBLE |

|  | TEXT | IMAGE |
|---|---|---|
| ODD-NUMBERED PAGE | POSSIBLE | IMPOSSIBLE |
| EVEN-NUMBERED PAGE | IMPOSSIBLE | POSSIBLE |

FIG. 14

|  | TEXT | IMAGE |
|---|---|---|
| PAGES OF FIRST HALF OF DOCUMENT | POSSIBLE | IMPOSSIBLE |
| PAGES OF SECOND HALF OF DOCUMENT | IMPOSSIBLE | POSSIBLE |

FIG. 15

DOCUMENT PROCESSING SYSTEM

BACKGROUND OF THE INVENTION

1. Field of the Invention

The present invention relates to a document processing system for processing documents comprising text data and image data such as figures, tables, and video images, and more particularly to a document processing system which can automatically lay out image data at appropriate locations in the text data.

2. Description of the Related Art

With the conventional document processing system such as a wordprocessor, desired image data such as a figure, a table, or a video image is laid out or embed in the text data forming a document, in the following method. First, an operator operates the keyboard of the system, thereby designating a desired location at which to lay out the desired image data in the text data. Then, the operator further operates the keyboard, thereby laying out the desired image at the location thus designated. (The image data is, in some cases, the data output by an image reader or a digitizer.) This method has a drawback. When the text data is edited, that is, corrected and/or altered, the image data may in some cases move to an undesirable position with respect to the text data. If this is the case, the operator must operate the keyboard to specify a new location at which to lay out the desired image data.

In a recently developed document processing system, such as a desktop publishing (DTP) system, a so-called anchored frame, i.e., a frame defining an image-data region, is laid out in the text, and then the desired image is laid out within the anchored frame. Once the anchored frame has been laid out in the text, it no longer necessary for the operator to designate the location at which to lay out the image in the text. In this method, the anchored frame is related to that part of the text in which the image to be laid out in the anchored frame is referred to. Hence, the image is automatically laid out near the part of the text, which will be hereinafter referred to as "image-referring part".

Since an anchored frame is laid within a text frame, i.e., a column of the text, it cannot be larger than the text frame. Hence, the anchored frame cannot be larger than the column. In other words, an image larger than the column of the text data cannot be laid out. Further, since images are laid out in the text unconditionally, but in the order they are referred to in the corresponding image-referring parts, they are laid out in disorder and irregularly, and the edited document is far from neat. To lay out these images at appropriate locations, the operator must operate the keyboard to change the locations of the images.

As has been pointed out, in the conventional document processing system, images cannot be laid out in the text if they are larger than the columns of text data. Further, the system automatically lays out images in the text, but not sufficiently neatly. Therefore, the operator of this system must lay out the images in the text orderly and regularly, spending much labor.

SUMMARY OF THE INVENTION

The object of the present invention is to provide a document processing system which can prepare a document formed of text data and image data, with the images appropriately laid out in the text, thus relieving the operator of much labor which he or she should otherwise spent to lay out the images properly in the text.

According to the invention, there is provided a document processing system which can appropriately lay out text data and an image data which is referred to in the text data, thereby to prepare a document formed of the text and images laid out at appropriate locations in the text. This document processing system comprises: format-data storage means for storing form data including region-attribute data representing at least an image-layout inhibited region in which to lay out no image data; reference-data storage means for storing reference data representing the relationship between any image-referring part of the text data and an image data which is referred to in that image-referring part; and data-layout section for laying out the text data and also laying out the image data outside the image-layout inhibited region, in accordance with the region-attribute data stored in the format-data storage means and the reference data stored in the reference-data storage means, thereby to prepare document data.

As has been pointed out, the format data includes region-attribute data defining the image-layout inhibited region, and the image is laid out in accordance with this region-attribute data and also with the reference data representing the relationship between any image-referring part of the text data and the image data referred to in that image-referring part. Therefore, images can be laid out orderly and regularly in the text, by designating the region-attribute data items. Since the region in which any image is to be laid out is determined from the reference data and the region-attribute data, it is unnecessary to set anchored frames in the text before editing the document. Hence, the region in which to lay out any image can be larger than the region in which the text data to be layed out.

Moreover, since each image is laid out in accordance with region-attribute data which defines an image-layout inhibited region, labor can be reduced on the part of the operator who edits the documents consisting of text data and image data.

DETAILED DESCRIPTION OF THE PREFERRED EMBODIMENTS

An embodiment of the invention will now be described with reference to the accompanying drawings.

Figure 1:
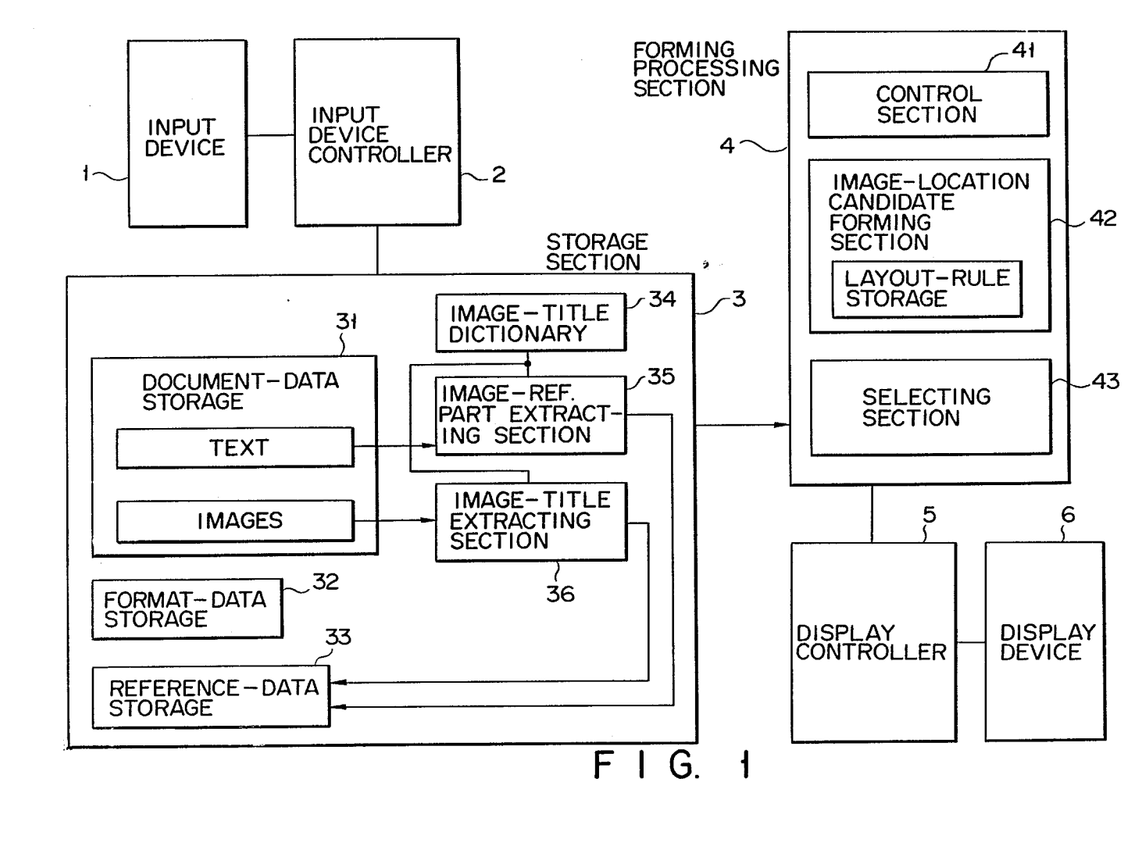
FIG. 1 is a block diagram schematically illustrating a document processing system according to an embodiment of the present invention.

FIG. 1 is a block diagram schematically illustrating a document processing system according to an embodiment of the present invention. As is shown in this figure, the system comprises an input device 1, an input device controller 2, a storage section 3, a forming processing section 4, a display controller 5, and a display device 6.

The input device 1 is operated by an operator, to input text data, image data, format data, text-image reference data, and command data to the system. The device 1 can have one or more data-input devices such as a keyboard and/or a mouse. The input device 1 operates under the control of the input device controller 2. The text data, the image data, the format data, and the other data, all input by operating the device 1, are stored in the storage section 3.

The storage section 3 has a document-data storage 31 for storing text data and image data, a format-data storage 32 for storing format data, a reference-data storage 33 for storing the text-image reference data, an image-title dictionary 34, an image-referring part extracting section 35, and an image-title extracting section 36. The image-title dictionary 34, the image-referring part extracting section 35, and the image-title extracting section 36 are used to determine the relationship between any image-referring part of the text and the image which is referred to in that image-referring part.

The forming processing section 4 comprises a control section 41 for controlling forming processing, an image-location candidate forming section 42 for forming location candidates for the images to be laid out in the text, under the control of the control section 41, and a selecting section 43 for selecting the most appropriate image-location candidate from the candidates formed by the section 42.

The display controller 5 controls the display device 6. The device 6 outputs the document formed from the document data prepared by the forming processing section 4. The display device 6 comprises an image display and/or a printer. The image display can be a CRT (Cathode Ray Tube), a liquid-crystal display, or a plasma display.

Figure 2:
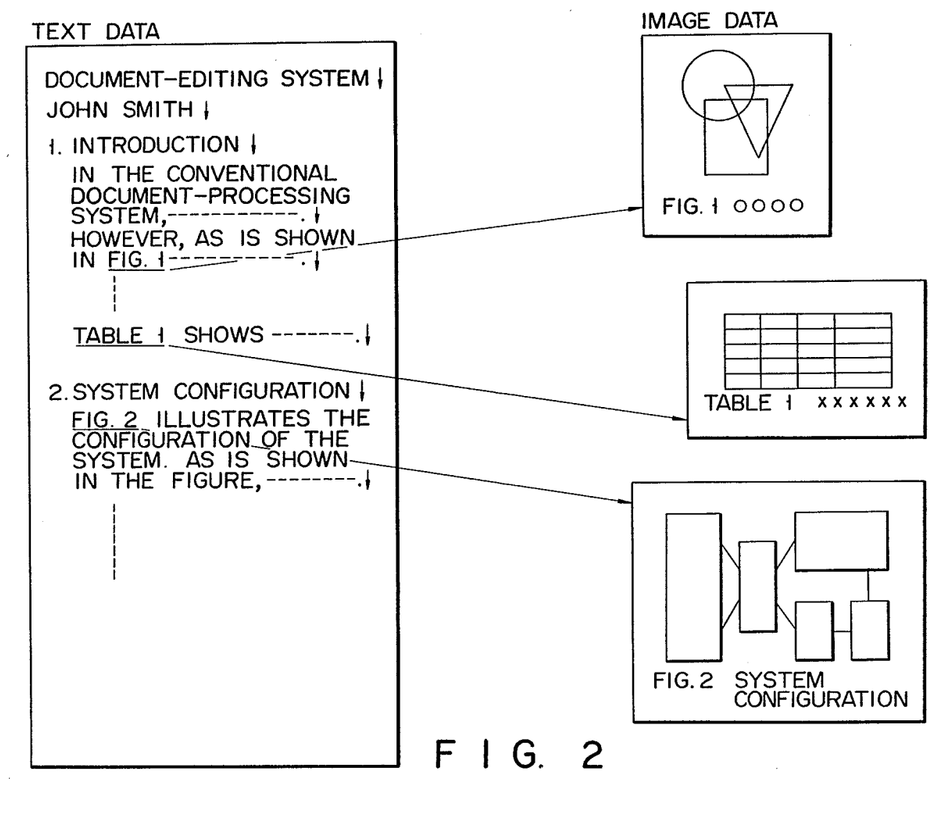
FIG. 2 is a diagram showing document data to be processed by means of the system illustrated in FIG. 1.

In operation, the text data and the image data, both input by operating the input device 1, are stored into the document-data storage 31. They are combined, thus forming the document data illustrated in FIG. 2. The text data contains key data items such as "FIG. 1," "Table 1," and "FIG. 2," which are referred to in the text. From these key data items there are automatically obtained text-image reference data items, each showing the relationship between an image-referring part of the text and the image referred to in this image-referring part. The text-image reference data items, obtained automatically, are stored into the reference-data storage 33. Alternatively, the operator can operate the input device 1, thus designating said relationship and then inputting text-image reference data item representing this text-image relationship.

More specifically, the reference data items are obtained in the following way. First, the image-referring part extracting section 35 chops the text data into sentences, in accordance with the punctuation marks and the carriage-return codes contained in the text data. Then, the section 35 performs matching process, that is, it compares each of the sentences with the image-title data items stored in the image-title dictionary 34, each consisting of an image classification word, an alphanumeric expression, and/or an additional word. The image-title data items for "FIG. 1," "Table 1," and "FIG. 2" are each analyzed as being:

[image classification word + alphanumeric expression]

Figure 3:
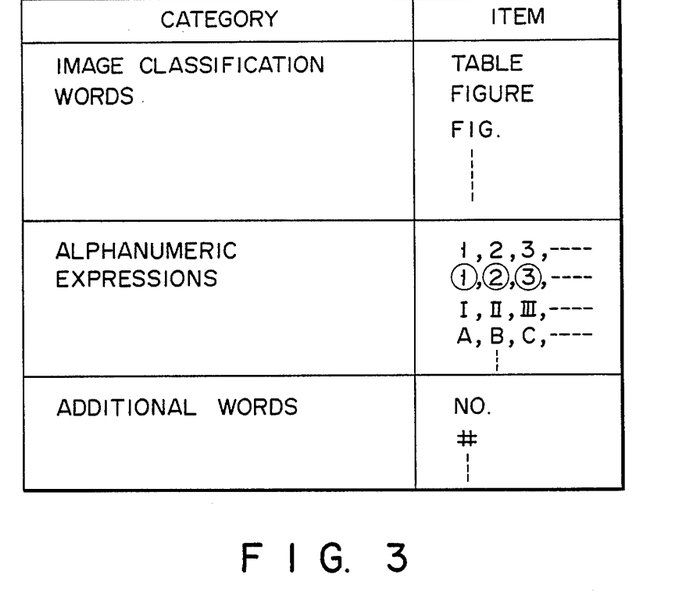
FIG. 3 represents the contents of the image-data title dictionary incorporated in the system illustrated in FIG. 1.
Figure 4:
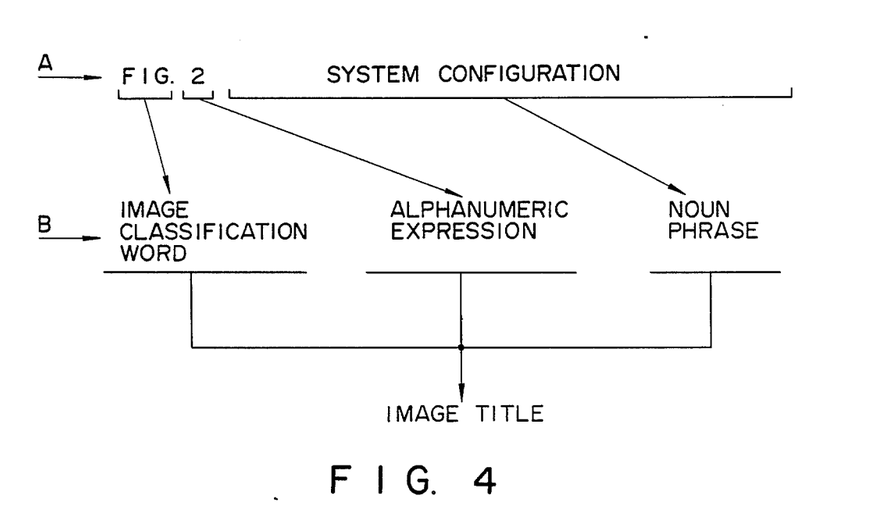
FIG. 4 is a diagram explaining how an image title is analyzed to be extracted in the system shown in FIG. 1.

A rule is registered in the system, that such a character data item is data rule for discriminating the corresponding key data item which represents an image to be referred in an image-referring part of the text. Based of this rule, the corresponding key data is extracted from the text data in accordance with the image-title data item. Some key data items have additional word such as "No.," in addition to an image classification word, as is illustrated in FIG. 3. The image-title extracting section 36 performs matching process, that is, it collates each character data item included in the image data stored in the document-data storage 31 with the image-title data items stored in the image-title dictionary 34. More precisely, as is shown in FIG. 4, character data item, "FIG. 2 SYSTEM CONFIGURATION," is analyzed to be a combination of:

[image classification word + alphanumeric expression + noun phrase]

A rule is registered in the system, that a character data item of this kind represents an image title. Based on this rule, any image title can be distinguished. Of the image title extracted from the section 36, [image classification word + alphanumeric expression] must be identical or similar to the [image classification word + alphanumeric expression] of the key data item which has been output by the image-referring part extracting section 35 and which represents that image-referring part of the text in which the image of said title is referred to. Therefore, when the key data item output by the section 35 is compared with the key data item extracted by the section 36, the text-image reference data item can be obtained which represents that the image-referring part is related to the image of that title. This text-image reference data item is stored into the reference-data storage 33.

The format data input by operating the input device 1 is stored into the format-data storage 32. The format data is formed of data representing the layout format of the text and attribute data representing the layout attribute of the images.

Figure 5:
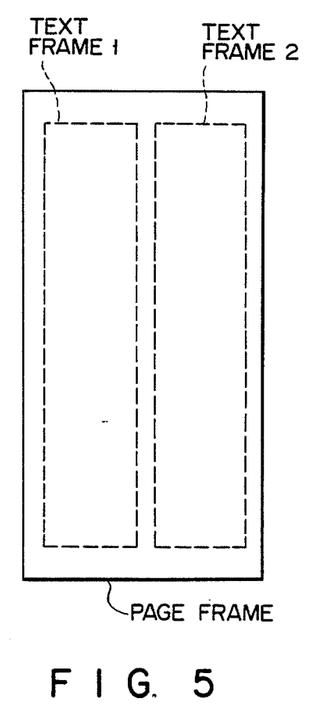
FIG. 5 shows a document format defined by the format data stored in the format-data memory incorporated in the system of FIG. 1.
Figure 6A:
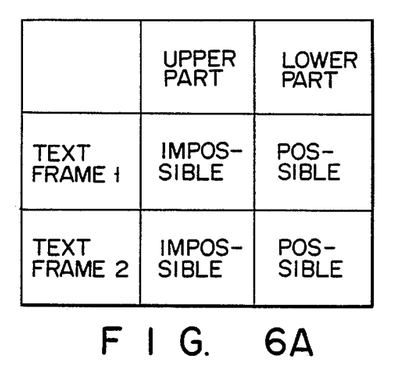
FIGS. 6A to 6C show region-attribute data items which are included in the format data and are to be used to lay out images in the text of a document.
Figure 6B:
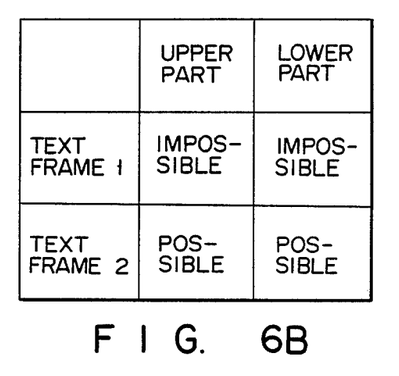
Figure 6C:
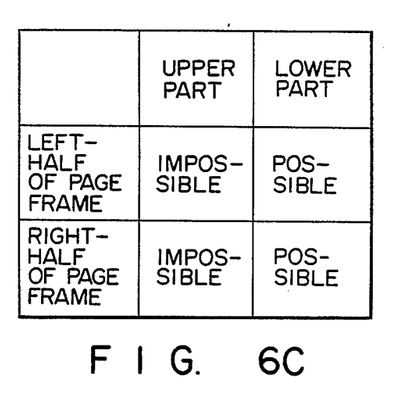
Figure 7A:
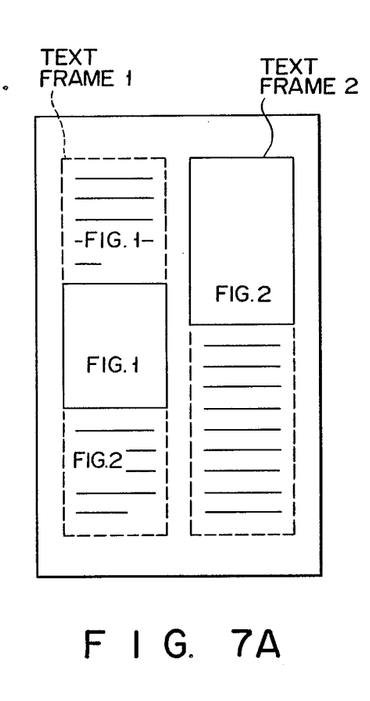
FIGS. 7A to 7C illustrate documents each including the images which have been laid out in accordance with the region-attribute data items shown in FIGS. 6A to 6C.
Figure 7B:
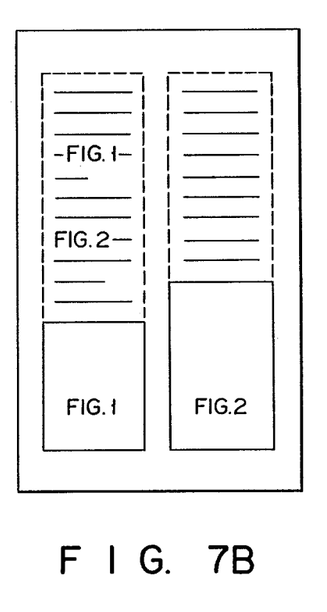
Figure 7C:
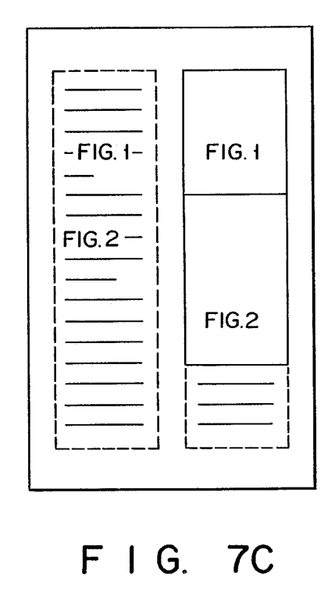

FIG. 5 illustrates an example of the text-layout format. This format consists of a page frame and two text frames 1 and 2 located within the page frame in double-column setting. The text data is to be laid out within the text frames 1 and 2, whereas the image data is to be laid out within the page frame 2. The attribute data specifies whether or not image frames can overlap the text frames. It represents regions related to the page frame or the text frame 1, in which no images should be laid out. More specifically, the attribute data represents whether or not images should be laid out in the upper or lower parts of the frames 1 and 2, as can be understood from FIGS. 6A and 6B. Alternatively, it can designate whether or not images can be laid out in the left text frame 1 or the right text frame 2, and in the upper or lower half of either text frame, as can be evident from FIG. 6C. If the format data contained no attribute data representing an image-layout inhibited region, a text and images would be laid out as is illustrated in FIG. 7A, with the images, i.e., FIGS. 1 and 2, located close to those image-referring parts of the text in which FIGS. 1 and 2 are referred to. When the attribute data is the one shown in FIG. 6A, FIGS. 1 and 2 will be laid out below those image-referring parts in which these figures are referred to, as is illustrated in FIG. 7B. When the attribute data is the one shown in FIG. 6B, FIGS. 1 and 2 will be laid out in the right text frame 2, as is illustrated in FIG. 7C. Obviously, the documents shown in FIGS. 7B and 7C are more neat than the document shown in FIG. 7A.

The image-layout attribute data are not limited to the data items described above and shown in FIGS. 6A to 6C. For instance, the attribute data can designate whether or not an image should be laid out within a rectangle whose diagonal extends from the position of the c-th column of the 1-th line to the position of the c'-th column of the 1'-th line. Alternatively, the attribute data can designate whether or not an image should be laid out within a circle whose center is located at the c-th column of the 1-th line.

After the document data (i.e., the text data and the image data), the format data, and the reference data have been stored into the storage section 3, the forming processing section 4 starts performing a forming processing. The forming processing will be explained, with reference to the flow chart shown in FIG. 8.

Figure 8:
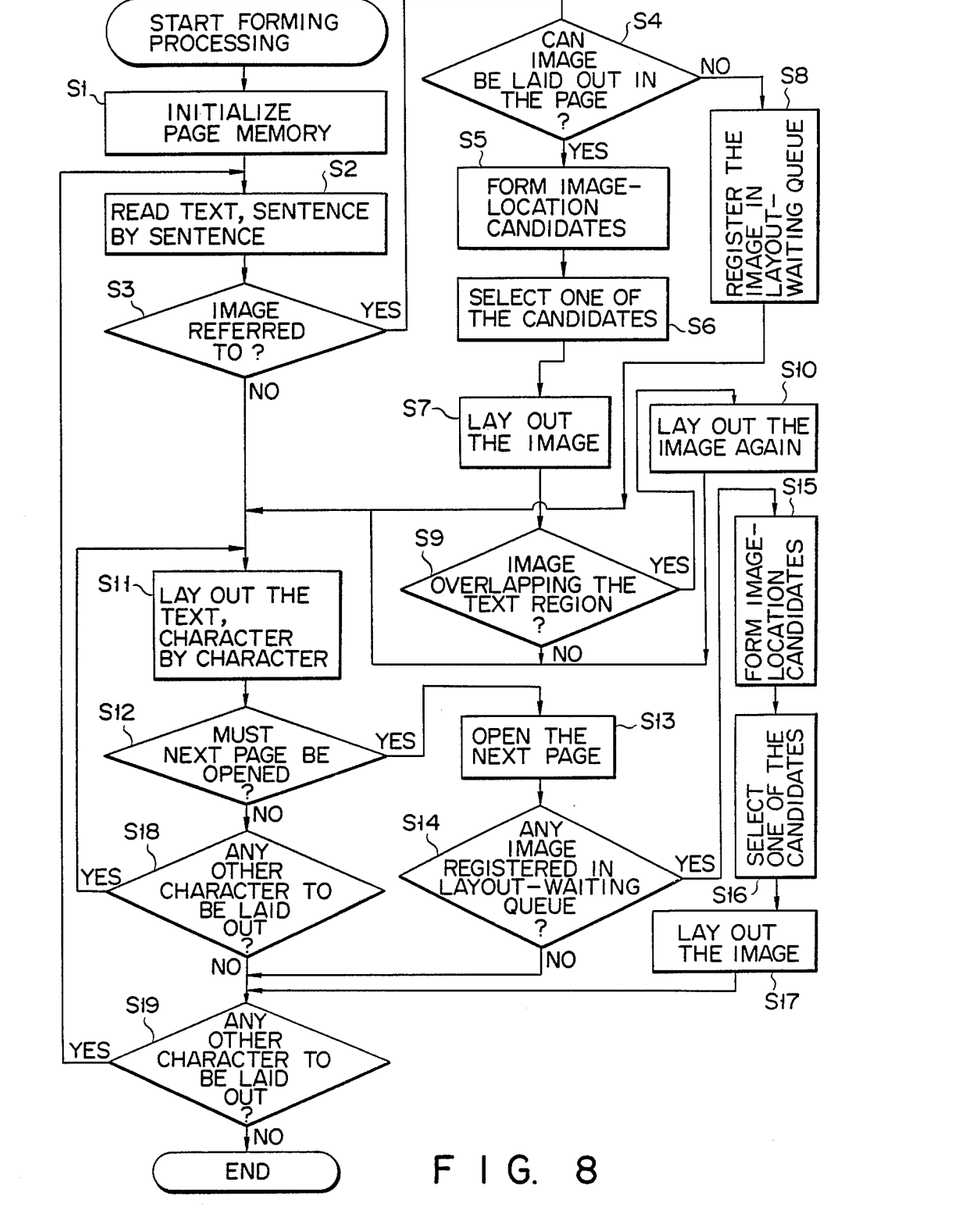
FIG. 8 is a flow chart explaining how a document is edited by means of the system illustrated in FIG. 1.

First, the page memory incorporated in section 4 is initialized (S1). Then, one page of the text data is read from the document-data storage 31 into this memory, sentence by sentence (S2). It is determined whether or not each sentence includes a key data item referring to an image (S3). If YES, it is determined whether or not the image can be laid out in the page of the text data (S4). If YES, the image is laid out in steps S5, S6, and S7. If NO, the image is registered in layout-waiting queue, so that the image can be laid out in any following page (S8). After the image has been laid out in steps S5, S6, and S7, if it is determined the image thus laid out overlaps the test region, the text, already layed out is laid out again such that it is located outside the image (S9 and S10). The text is laid out, character by character (S11). Every time one character is laid out, it is determined whether or not the next page must be opened (S12). If NO, it is determined whether or not there is any other character to be laid out (S18). If YES, the operation returns to step S11. If YES in step S12, the next page is opened (S13). Then, steps S14, S15, S16, and S17 are executed, thereby laying out the image registered in the layout-waiting queue. After the image has been laid out in step S17, the operation goes to step S19. Also, if NO in step S14, the operation goes to step S19. In step S19, it is determined whether or not there is any other character to be laid out. If YES, the operation goes to step S2. Hence, steps S2 to S19 are repeated until there is no other character to be laid out.

In steps S5 and S15, image-location candidates are formed. In steps S6 and S16, the most appropriate image candidate is selected.

Figure 9:
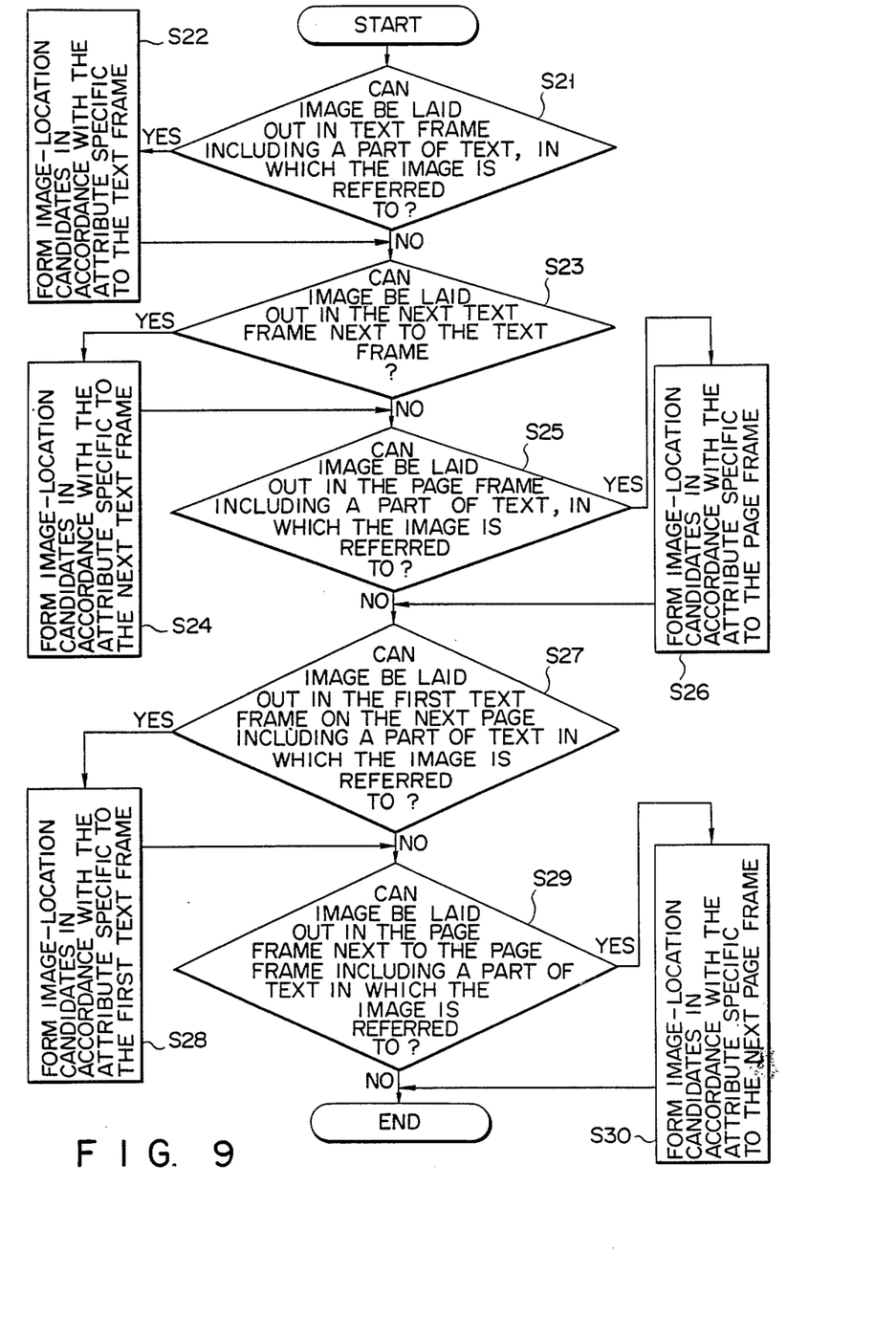
FIG. 9 is a flow chart explaining how location candidates for images are defined in the system of FIG. 1.
Figure 10A:
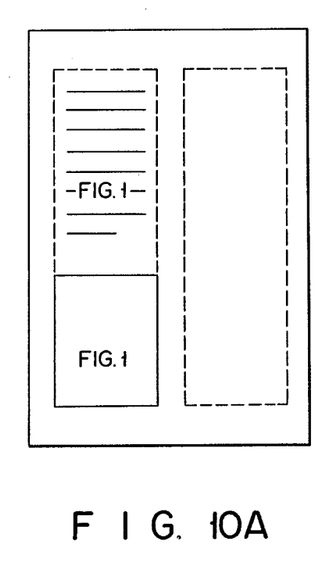
FIGS. 10A to 10E illustrate documents, each including images laid out at the location candidates formed by the operation performed as is shown in the flow char of FIG. 9.
Figure 10B:
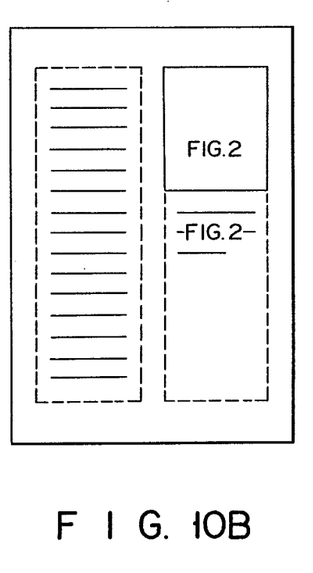
Figure 10C:
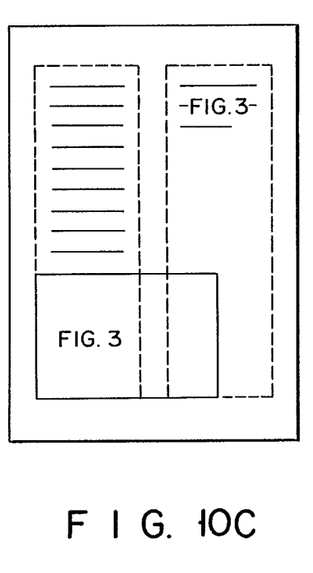
Figure 10D:
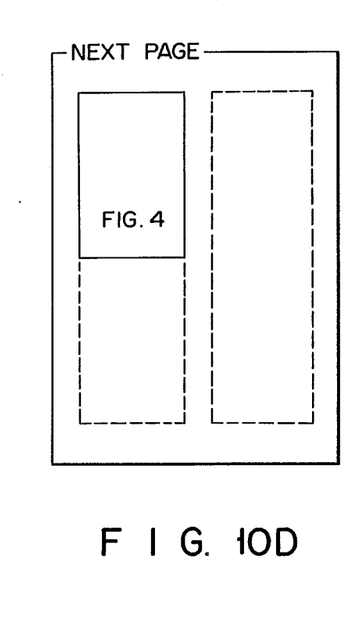
Figure 10E:
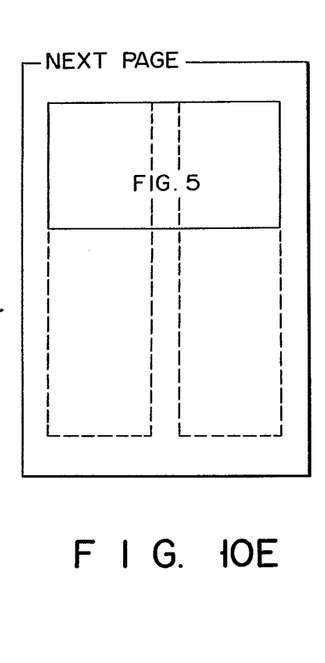
Figure 11A:
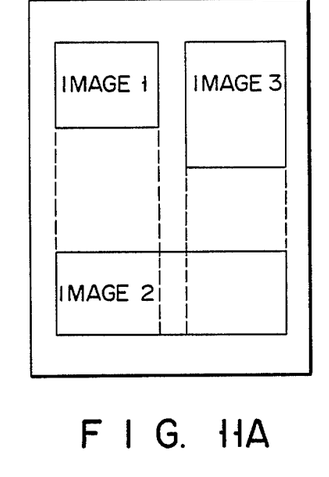
FIGS. 11A to 11D illustrate documents which have been laid out inappropriately.
Figure 11B:
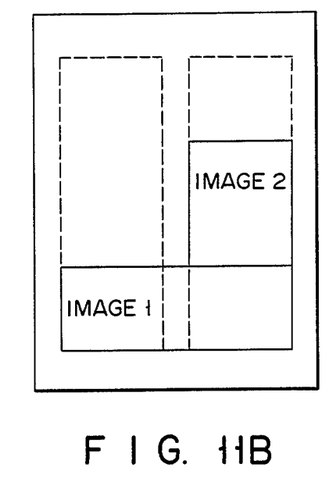
Figure 11C:
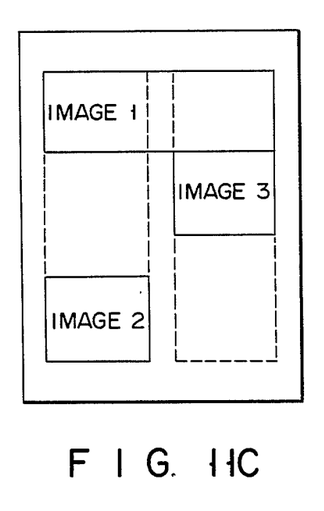
Figure 11D:
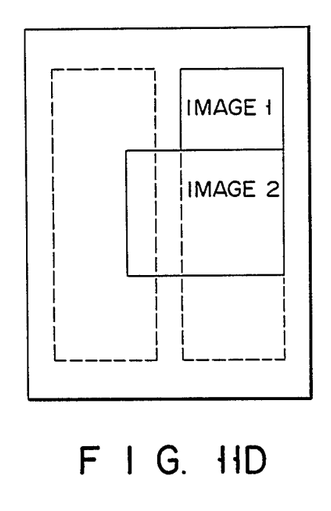
Figure 12A:
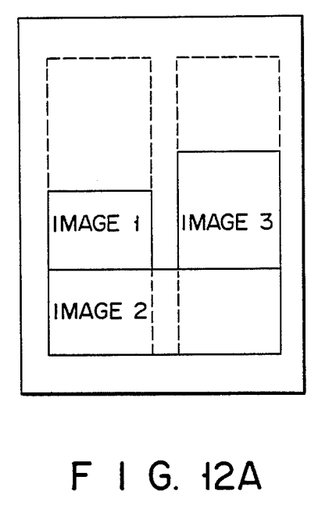
FIGS. 12A to 12D show documents, each including images laid out at appropriate location candidate.
Figure 12B:
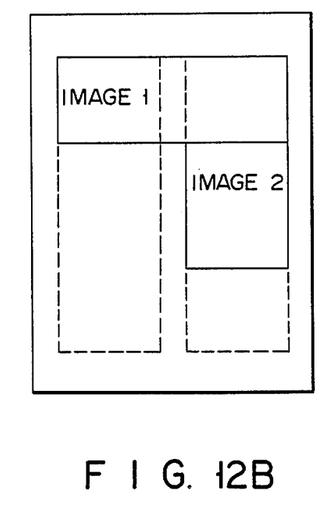
Figure 12C:
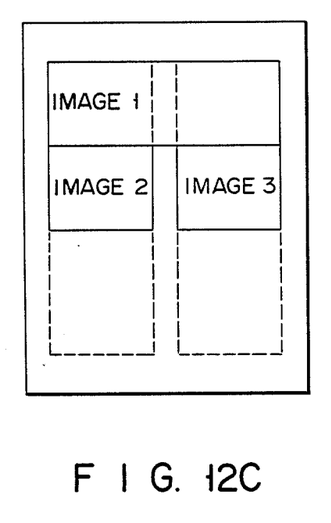
Figure 12D:
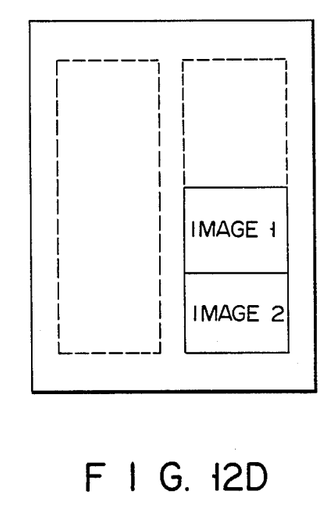

It will now be explained, in detail, how image-location candidates are formed, and how one of these candidates is selected, with reference to the flow chart shown in FIG. 9.

Image-location candidates are formed by performing the following processes sequentially:

(1) It is determined whether or not the image can be laid out within the text frame containing the key data item (S21). If YES, image-location candidates are formed in accordance with the image-layout attribute specific to the text frame (S22).

(2) If NO in step S21, that is, if the image cannot be laid out within the text frame, it is determined whether or not the image can be laid out in the next text frame on the same page (S23). If YES, image-location candidates are formed in accordance with the image-layout attribute specific to this text frame (S24).

(3) If NO in step S23, it is determined whether or not the image can be laid out within the page frame (S25). If YES, image-location candidates are formed in accordance with the image-layout attribute specific to the page frame (S26).

(4) If NO in step S25, it is determined whether or not the image can be laid out within the first text frame on the next page (S27). If YES, image-location candidates are formed in accordance with the image-layout attribute specific to the first text frame of the next page (S28).

(5) If NO in step S27, it is determined whether or not the image can be laid out within the page frame next to the page frame including a part of the text in which the image is referred to (S29). If YES, image-location candidates are formed in accordance with the image-layout attribute specific to the next page frame (S30).

When each of the processes (1) to (5) is carried out, at least one image-location candidate is formed. FIGS. 10A to 10E are diagrams showing one-page documents, specifying the image-location candidates formed by performing the processes (1) to (5), respectively. To form image-location candidates for the following pages, it suffices to repeat the processes (1) to (5). Since the image-location candidates have been formed in accordance with the image-layout attributes, the images can overlap the text frame, thereby to prepare a neat document.

Since the image-location candidates have been formed in accordance with the image-layout attributes of the respective text frames and page frames, the document containing images laid out at the locations defined by these candidates is fairly neat. However, it is possible that the images are laid out as is shown in FIGS. 11A to 11D. In the case of the documents shown in FIGS. 11A and 11B, the images are not laid out in the order of the serial numbers assigned to them. In the case of the documents shown in FIGS. 11A and 11C, all images are not laid out close to one another. In the case of the document illustrated in FIG. 11D, an image extends into a text region, shaping the text region in the form of letter C. The images must therefore be laid out at more appropriate locations or be reduced, in the documents shown in FIGS. 11A to 11D, thereby to render these documents more neat. It is the selecting section 43 (FIG. 1) that selects the most appropriate image-location candidate for each image and, if necessary, reduces the image. As a result, the documents are laid out again to become more neat, as is illustrated in FIGS. 12A to 12D. The selecting section 43 can perform its function, either automatically or partly in response to the commands input by the operator. Even if the operator inputs commands to the section 43, he needs not spend much labor to edit documents to make them neat, since image-location candidates are formed for each image, and the most appropriate candidate is selected for the image.

Figure 13:
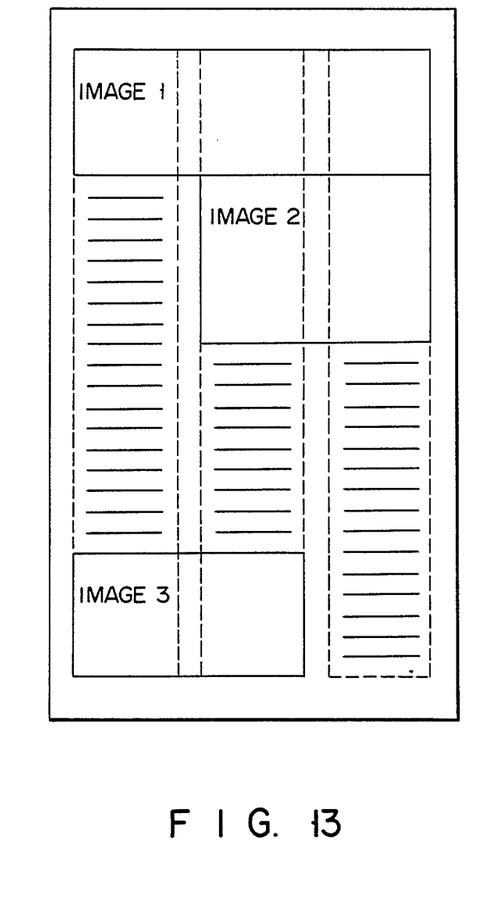
FIG. 13 is a diagram showing a document which has been laid out by means of another embodiment of the present invention.

The present invention is not limited to the embodiment described above, in which images are assigned to page frames or text frames. Instead, images can be assigned to adjacent text frames, in which case the images can be laid out as is shown in FIG. 13. Further, a title region in which the title of a document is laid out can be treated as a kind of an image region. In this case, the title (image 1) can be laid out as is shown in FIG. 13.

Figure 14:
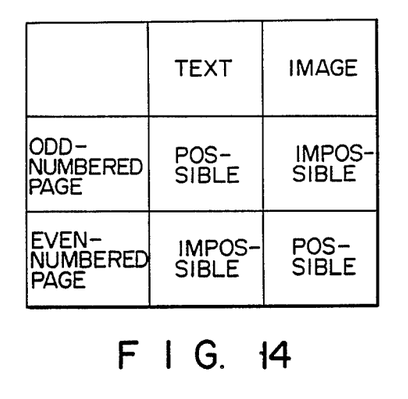
FIGS. 14 and 15 schematically show two examples of region-attribute data items which are used in still another embodiment of the present invention.
Figure 15:
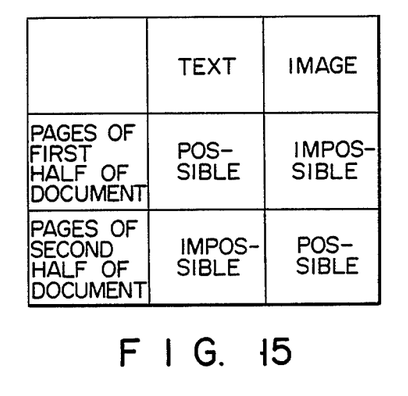

Moreover, the image-layout attribute data can designate specific image-locations within one page frame, but also specific pages in which the images are to be laid out, as can be understood from FIGS. 14 and 15. More precisely, as is shown in FIG. 14, the image-layout attribute data can specify that images be laid out on odd-numbered pages only, whereas the text be laid out on even-numbered pages. As is shown in FIG. 15, the image-layout attribute data can specify that images be laid out on the pages of the second half of the document, whereas the text be laid out on the pages of the first half of the document. Further, if necessary, a different image-layout attribute can be assigned to each page of a document.

What is claimed is:

1. A document processing system for appropriately laying out text data and an image data which is referred to in the text data, thereby to prepare a document formed of the text and images laid out at appropriate locations in the text, said system comprising:
   format-data storage means for storing format data including region-attribute data representing at least an image-layout inhibited region in which to lay out no image data;
   reference-data storage means for storing reference data representing the relationship between any image-referring part of the text data and an image data which is referred to in that image-referring part; and
   data-layout section for laying out the text data and also laying out the image data outside said image-layout inhibited region, in accordance with the region-attribute data stored in said format-data storage means and the reference data stored in said reference-data storage means, thereby to prepare document data.

2. A system according to claim 1, wherein the format data stored in said format-data storage means includes region-attribute data assigned to each page of a document.

3. A system according to claim 1, wherein the format data stored in said format-data storage means includes region-attribute data assigned to at least one specific page of a document.

4. A system according to claim 3, wherein the format data stored in said format-data storage means includes a plurality of region-attribute data items assigned to at least one specific page of a document.

5. A system according to claim 1, wherein the format data stored in said format-data storage means includes a plurality of region-attribute data items assigned to a plurality of regions of one page of a document.

6. A system according to claim 1, wherein the format data stored in said format-data storage means includes text-region data specifying the region in which the text data is to be laid out.

7. A system according to claim 1, further comprising means for setting format data to be stored into said format-data storage means.

8. A system according to claim 1, wherein the reference data to be stored into said reference-data storage means includes data representing the relationship between an image and the image-referring part of the text in which the image is referred to.

9. A system according to claim 1, further comprising reference-data forming means for forming reference data to be stored into said reference-data storage means.

10. A system according to claim 9, wherein said reference-data forming means includes means for detecting a key data item contained in the text data and referring to the image data, and for extracting the image-referring part.

11. A document processing system comprising:
    input means for inputting document data containing of text data and image data which is referred to in the text data;
    document-data storage means for storing the text data and the image data input from said input means;
    format-data storage means for storing format data including region-attribute data representing at least an image-layout inhibited region in which to lay out no image data;
    reference-data storage means for storing reference data representing the relationship between any image-referring part of the text data and an image data which is referred to in that image-referring part;
    image-location candidate forming means for laying out the text data stored in said text-data storage means, in accordance with the region-attribute data stored in said format-data storage means and the reference data stored in said reference-data storage means, and for forming image-location candidates which are outside the image-layout inhibited region, in accordance with the reference data;
    image-location selecting means for selecting one of the image-location candidates formed by said image-location candidate forming means; and
    output means for outputting document data with an image laid out at a location corresponding to the image-location candidate selected by said image-location selecting means.

12. A system according to claim 11, wherein the format data stored in said format-data storage means includes region-attribute data assigned to each page of a document.

13. A system according to claim 11, wherein the format data stored in said format-data storage means includes region-attribute data assigned to at least one specific page of a document.

14. A system according to claim 13, wherein the format data stored in said format-data storage means includes a plurality of region-attribute data items assigned to at least one specific page of a document.

15. A system according to claim 11, wherein the format data stored in said format-data storage means includes a plurality of region-attribute data items assigned to a plurality of regions of one page of a document.

16. A system according to claim 11, wherein the format data stored in said format-data storage means includes text-region data specifying the region in which the text data is to be laid out.

17. A system according to claim 11, further comprising format-data inputting means for setting format data to be stored into said format-data storage means.

18. A system according to claim 17, wherein said format-data inputting means is incorporated in said input means.

19. A system according to claim 11, wherein the reference data to be stored into said reference-data storage means includes data representing the relationship between an image and the image-referring part of the text in which the image is referred to.

20. A system according to claim 11, further comprising reference-data forming means for forming reference data to be stored into said reference-data storage means.

21. A system according to claim 20, wherein said reference-data forming means includes means for detecting a key data item contained in the text data and referring to the image data, and for extracting the image-referring part.

22. A system according to claim 11, wherein said image-location selecting means includes selection-limiting means for selecting an image-location candidate in accordance with predetermined conditions of laying out images.

23. A system according to claim 22, wherein one of the predetermined conditions of laying out images is a serial number assigned to an image.

24. A system according to claim 22, wherein one of the predetermined conditions of laying out images is that a plurality of images should be laid out on the same page, located close to each other.

25. A system according to claim 11, wherein said image-location selecting means includes rearranging means for selecting another image-location candidate after said image-location candidate has been selected, so that images can be laid out on each page in accordance with predetermined conditions.

26. A system according to claim 25, wherein one of the predetermined conditions is a serial number assigned to each image.

27. A system according to claim 25, wherein one of the predetermined conditions is that a plurality of images should be laid out on the same page, located close to each other.

* * * * *